Figure 1:
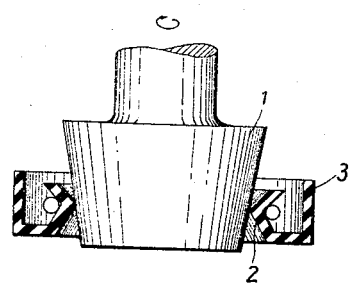

Sept. 13, 1966  H. BÄUMLER  3,271,995
MEASURING THE RADIAL FORCE EXERTED BY SHAFT SEALING RINGS
Filed Nov. 15, 1963

Inventor
HERMANN BÄUMLER
By *[signature]*
Atty

United States Patent Office 3,271,995
Patented Sept. 13, 1966

3,271,995
MEASURING THE RADIAL FORCE EXERTED BY SHAFT SEALING RINGS
Hermann Bäumler, Burscheid, near Cologne, Germany, assignor to Goetzewerke Friedrich Goetze Aktiengesellschaft, Burscheid, near Cologne, Germany, a corporation of Germany
Filed Nov. 15, 1963, Ser. No. 324,068
Claims priority, application Germany, Nov. 20, 1962, G 36,444
6 Claims. (Cl. 73—9)

The invention disclosed herein is concerned with the measuring of the radial force exerted by a sealing ring on a shaft which is to be sealed thereby.

Shaft sealing rings comprise as an important feature an annular sealing lip made of elastic material, such lip being radially in pressure engagement with the shaft which is to be sealed. The magnitude of this pressure force is of considerable importance for the sealing function. Owing to the friction existing between the sealing lip and the surface of the shaft, previous attempts to measure this pressure force were attended by disturbances resulting in impermissibly great measuring errors.

According to the invention, the pressure force is determined by introducing into the annular sealing lip of a shaft sealing ring a measuring cone with known inclination and measuring the axial force acting between the measuring cone and the shaft sealing ring, which axial force results from the force produced on the cone by the wedging action of the cone in the sealing ring. The effect of the frictional force between the sealing lip and the surface of the shaft is avoided by moving the measuring cone and the sealing lip relative to each other transversely to the measuring direction, that is, rotating them relatively about a common median line.

The slight shifting of the measurement value which is caused by the fact that the angle of engagement of the sealing lip with the measuring cone is different from the angle of engagement thereof with a cylindrical shaft, can be avoided by insertion of the cone from alternate sides of the sealing ring and formation of an average value.

For an accurate determination of the absolute value, the measuring cone is inserted or dipped into the sealing lip up to a depth corresponding to the rated diameter of the shaft which is to be sealed by the lip of the respective sealing ring.

Upon conducting control measurements in connection with a relatively great number of shaft sealing rings, it will be sufficient to establish information as to whether the pressure force of the respective sealing lips lies within or outside of a given tolerance limit. The measurement operations can be accelerated in such cases, by shifting the measuring cone or the shaft sealing rings, respectively, against a fixed stop and merely checking whether the axial resilient deviation of the shaft sealing rings or the measuring cone, respectively, remains in a desired normal position within a tolerance region established for such position. In connection with such procedure, the measuring spring which backs the shaft sealing ring or measuring cone axially, shall advantageously be stiffer, as is the spring characteristic curve thereof, than the axial component of the force of the shaft sealing ring on the measuring cone.

Upon merely conducting control measurements, the measuring cone and a shaft sealing ring may be joined for the measurement by applying a predetermined force, for example, by the use of a weight or compressed air (instead of moving the respective parts with respect to a fixed stop) and measuring the axial deviation from a desired normal depth of insertion of the cone into the lip of the sealing ring.

The various features and details of the invention will appear from the appended claims and from the description of embodiments which is rendered below with reference to the accompanying drawing.

Figure 2:
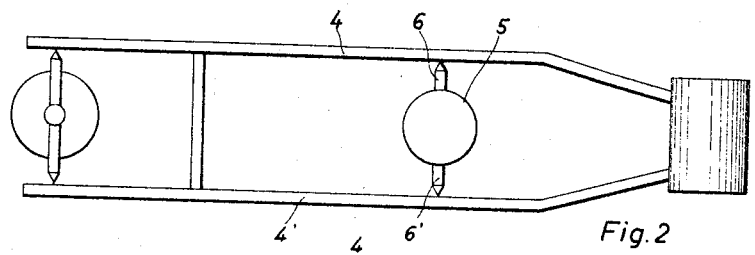
Figure 3:
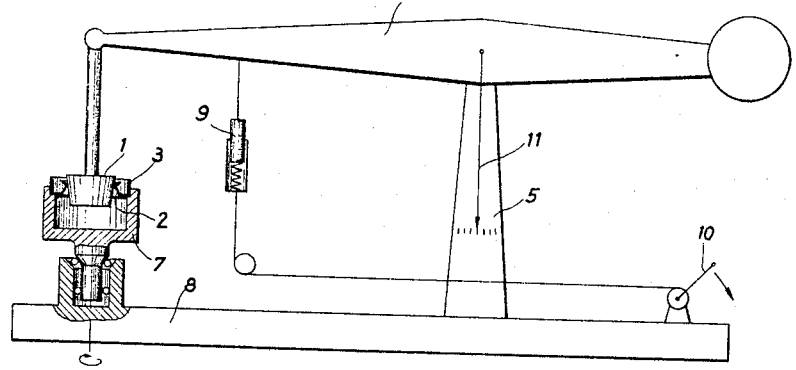
Figure 4:
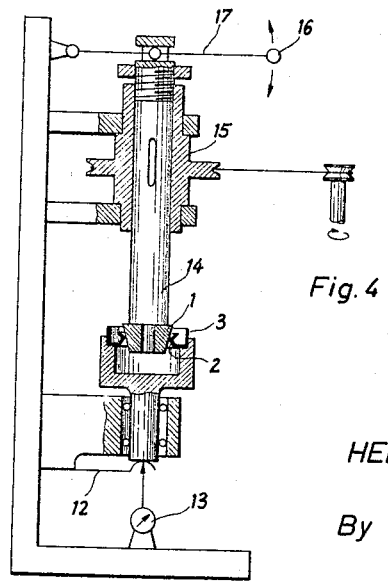

FIG. 1 explains the principles applied in realizing the invention;

FIG. 2 is a top view and FIG. 3 a side view of a measuring device comprising a scale beam; and FIG. 4 indicates a measuring device comprising two relatively movable coaxially arranged spindles for holding the measuring cone and the shaft sealing ring, respectively.

The measuring cone 1 shown in FIG. 1 is axially and radially movable and is dipped into the lip 2 of a shaft sealing ring 3. The radial tension of the sealing lip 2 is calculated from the depth of insertion of the cone into the shaft sealing lip and the force required for the insertion thereof to a given depth.

The device represented in FIGS. 2 and 3 comprises a scale beam 4, 4' which is with the aid of pins 6, 6' movably journalled upon a stand 5. The measuring cone 1 is pivotally journalled at the left or front end of the scale beam 4, 4', so that it can be dipped or inserted into the sealing lip 2 of the shaft sealing ring 3 which is supported by the holder 7, the latter being rotatably disposed on the base 8. The force required for the insertion of the measuring cone 1 into the annular sealing lip 2 is measured with the aid of a spring scale 9. The journalling by means of the pins 6, 6', of the arms 4, 4' of the scale beam, permits free pivotal motion of the scale beam substantially without pivotal friction about its axis while preventing lateral movement of the arms.

In order to measure the radial force of the sealing lip 2 of the shaft sealing ring 3, such ring is inserted into the holder 7. The latter rotates, thereby rotating the shaft sealing ring 3 with its sealing lip 2. The measuring cone 1 is during such rotation of the sealing ring inserted or dipped into the sealing lip 2 by pivotally displacing the scale beam 4, 4' by rotating the crank 10 until the pointer 11 indicates the predetermined depth of insertion thereof. The spring scale 9 indicates the force required for the insertion of the measuring cone into the sealing lip of the shaft sealing ring which is being examined.

In the arrangement according to FIG. 4, the holder into which is placed the shaft sealing ring 3, is axially movably disposed in engagement with a spring 12 which is arranged for cooperation with an indicating instrument 13. The measuring cone 1, which is to be inserted into the sealing lip 2 of the ring 3, is connected with a spindle 14 which is axially movably journalled in a rotatably disposed bushing 15 for rotation therewith. The measuring cone 1 is inserted into the sealing lip 2 by shifting the weight 16 with respect to the lever arm 17. The force required for the insertion of the measuring cone into the sealing lip is indicated by the instrument 13.

In accordance with a further feature of the invention, an agent which reduces the friction and/or improves the slide surface of the shaft sealing ring, for example, a dry lubricant known as Molykote $MOS_2$, is applied to the sealing ring and particularly to the parts thereof which form the slide surface of the sealing lip which is being examined as to radial force exerted thereby. The dry lubricant reduces the friction between the measuring cone and the sealing lip, which are during the measuring operations subjected to relative motion, thus avoiding the use of a lubricant such as oil or the like. The dry lubricant is incident to the relative motion between the parts massaged into the surface of the sealing lip, resulting in a durable protective film which advantageously affects the subsequent operation of the sealing ring in cooperation with a shaft. The dry lubricant can be applied, for example, by spraying. The intention of carrying out a 100% control of shaft sealing rings is greatly supported by the indicated use of a dry lubricant, without entailing any particular expenditures for the application thereof. It should also be considered that sealing rings which had been lubricated with oil must be subsequently degreased which is in connection with the described feature of the invention completely avoided.

Changes may be made within the scope and spirit of the appended claims which define what is believed to be new and desired to have protected by Letters Patent.

I claim:

1. A device for measuring the radial force exerted by the sealing lip of an annular shaft sealing ring, comprising a holder for receiving a sealing ring which is to be tested, a measuring cone having a predetermined taper and adapted for insertion small end foremost into said sealing ring, support means supporting said holder with said sealing ring and said measuring cone in substantial axial alignment and operable to permit relative axial motion therebetween so as to allow said cone to be inserted into said sealing ring, and indicating means for indicating the axial force exerted by said sealing lip on and measuring cone when said cone is inserted into said sealing into said sealing ring a predetermined axial distance.

2. A device according to claim 1, comprising stop means for one of said holder and cone against which the said one of said holder and cone is held during a measuring operation to predetermine the position thereof and means resiliently supporting the other of said holder and cone whereby upon insertion of the cone into a sealing ring in said holder, said resilient means can be employed to ascertain axially resilient deviation of the said other of said holder and cone from a desired normal measuring position thereof.

3. A device according to claim 1, comprising coaxially extending spindles for said measuring cone and said holder, respectively, said spindles being movable relatively in the axial direction and at least one thereof being resiliently supported in the axial direction, and means for rotating at least one of said spindles.

4. A device according to claim 1, said support means comprising a scale beam having means at one end thereof for supporting one of said holder and cone for free pendulous motion on said beam but secured against rotation about its axis on said beam, and means pivotally but angularly non-rotatably journalling said scale beam for movement of the supported one of said holder and cone in the direction of its axis toward and away from the other thereof.

5. A device according to claim 4, in which said indicating means comprises a spring-controlled scale having one end connected with said scale beam operable by movement of the other end thereof for moving said scale beam in a direction to effect insertion of said cone into a sealing ring in the holder, said scale also being operable to detect and indicate the force exerted thereby on the scale beam to cause insertion of the cone with the sealing ring a predetermined amount.

6. A device according to claim 1, which includes a film of a dry lubricant applied to said sealing ring to reduce the friction incident to the relative motion thereof with respect to said measuring cone.

References Cited by the Examiner

UNITED STATES PATENTS

| | | | |
|---|---|---|---|
| 2,972,881 | 2/1961 | Koch | 73—9 |
| 3,030,800 | 4/1962 | Dega | 73—46 X |
| 3,100,989 | 8/1963 | Jones | 73—140 |

RICHARD C. QUEISSER, *Primary Examiner.*

C. A. RUEHL, *Assistant Examiner.*